(12) United States Patent
Henry et al.

(10) Patent No.: US 6,917,990 B2
(45) Date of Patent: Jul. 12, 2005

(54) METHOD AND STRUCTURE FOR READ PREFETCH IN A STORAGE COMPLEX ARCHITECTURE

(75) Inventors: Russell J. Henry, Wichita, KS (US);
Bret S. Weber, Wichita, KS (US);
Dennis E. Gates, Wichita, KS (US);
John R. Kloeppner, Buhler, KS (US);
Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 59 days.

(21) Appl. No.: 10/328,672

(22) Filed: Dec. 23, 2002

(65) Prior Publication Data

US 2004/0122987 A1 Jun. 24, 2004

(51) Int. Cl.$^7$ .................................................. G06F 3/00
(52) U.S. Cl. ................................ 710/6; 710/7; 710/29; 710/40
(58) Field of Search ........................... 710/5, 6, 7, 29, 710/36, 40

(56) References Cited

U.S. PATENT DOCUMENTS

| | | | | |
|---|---|---|---|---|
| 5,309,451 A | * | 5/1994 | Noya et al. .................. | 714/766 |
| 5,740,465 A | * | 4/1998 | Matsunami et al. ........... | 710/5 |
| 6,314,472 B1 | * | 11/2001 | Trieu et al. ..................... | 710/5 |
| 6,330,630 B1 | * | 12/2001 | Bell ............................ | 710/312 |

OTHER PUBLICATIONS

Sadao Ishii, Eiji Yamamoto, Hidenori Hara, Eiji Watanabe, Ahmet M. Hava, Xiaorang Xia, International Power Electronics Conference,"A Vector Controlled High Performance Matrix Converter—Induction Motor Drive", Apr. 2000, pp. 235–240, Tokyo, Japan.

* cited by examiner

Primary Examiner—Jeffrey Gaffin
Assistant Examiner—Alan Chen
(74) Attorney, Agent, or Firm—Duft Bornsen & Fishman, LLP

(57) ABSTRACT

Methods and associated structure for improving storage system performance by reducing latency associated with communication medium transactions internal to a storage subsystem. In one aspect of the present invention, an I/O control element associated with a storage system transmits prefetch read requests to an associated storage element of the storage system in response to receipt of a host system request. This allows the storage element to commence data transfer to the I/O element in advance of the I/O element returning the data to the host system. Subsequent transfers of data from the storage element to the I/O element then overlap the transfer of data from the I/O element to the host. In another specific aspect of the present invention, methods and associated structures eliminate latency associated with PCI-X bus split transactions between the front-end (host interface portion) of the I/O element and the back-end (storage element interface) of the I/O element by overlapping the transfer of prefetched data to the host system with continued fetching of subsequent data from the storage element.

17 Claims, 5 Drawing Sheets

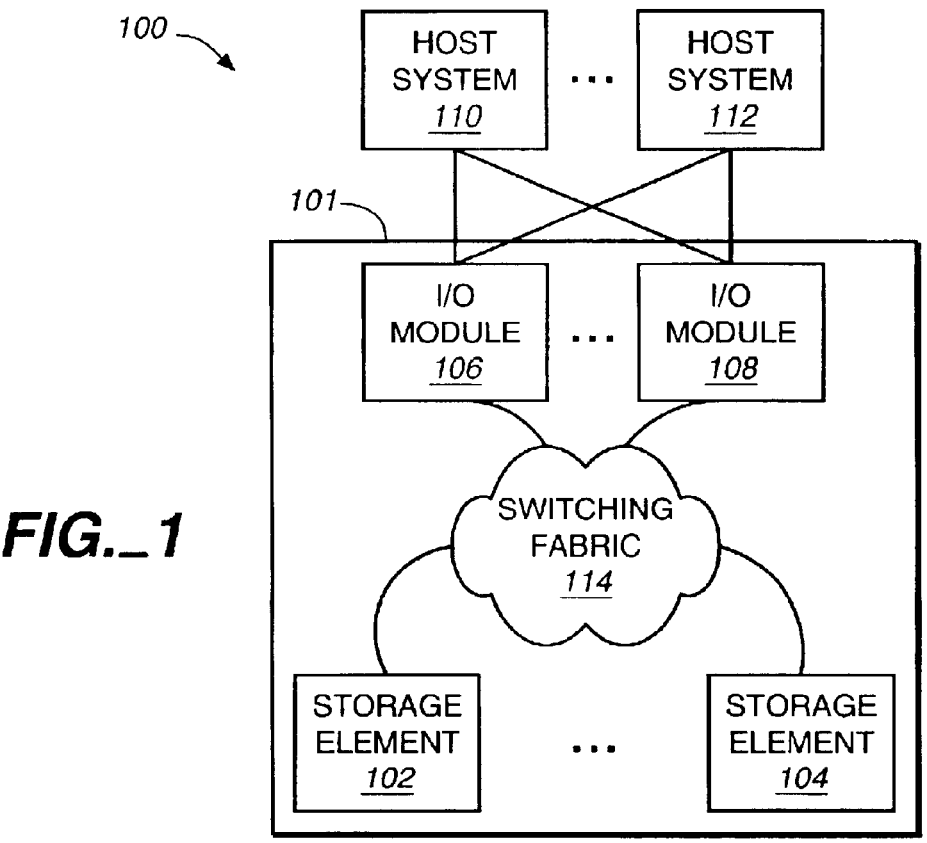
FIG._1
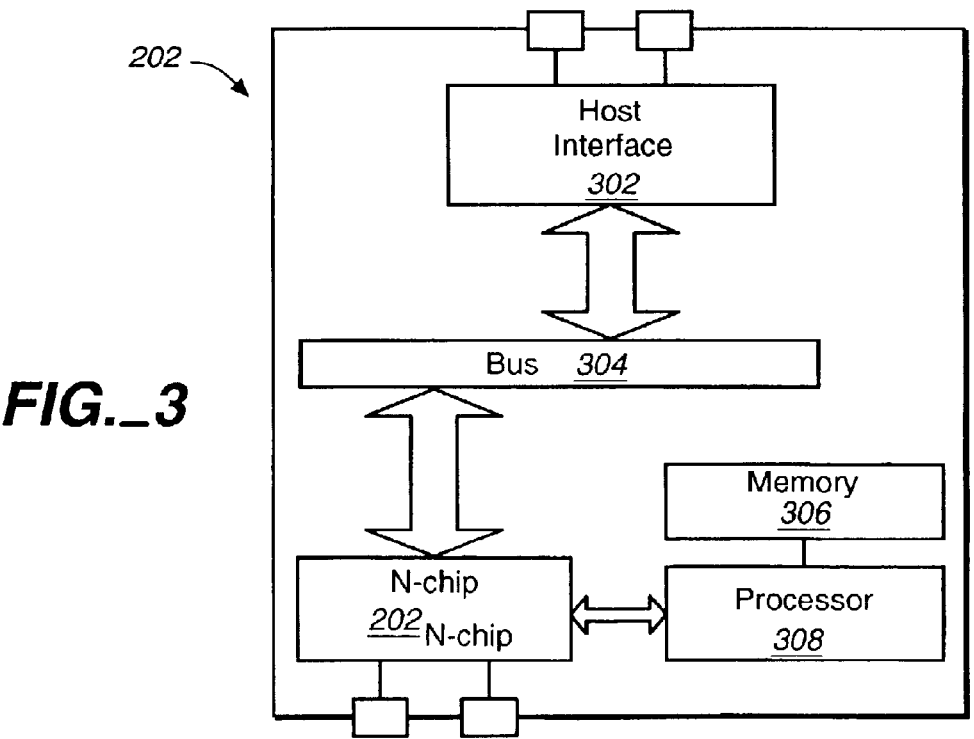
FIG._3

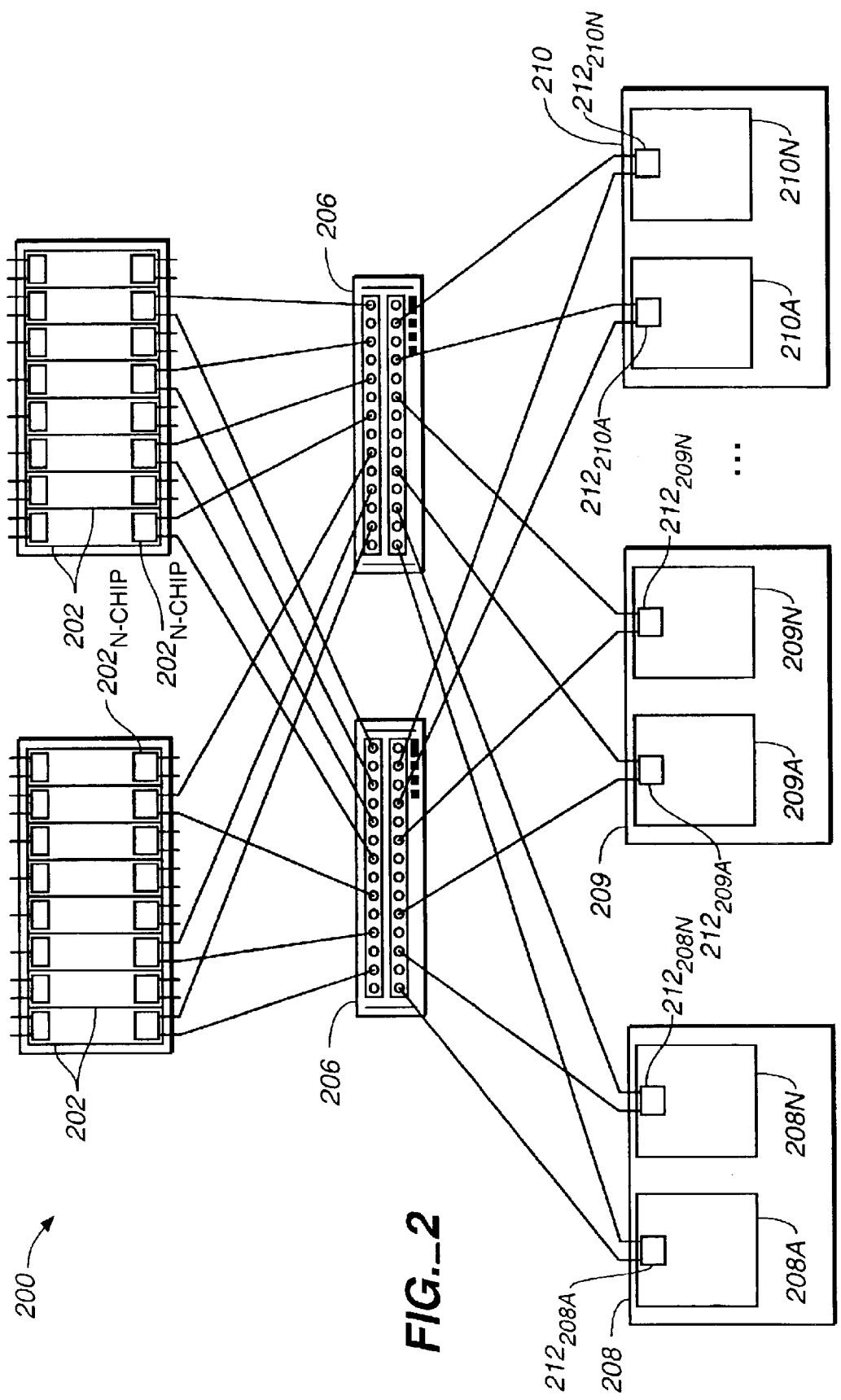

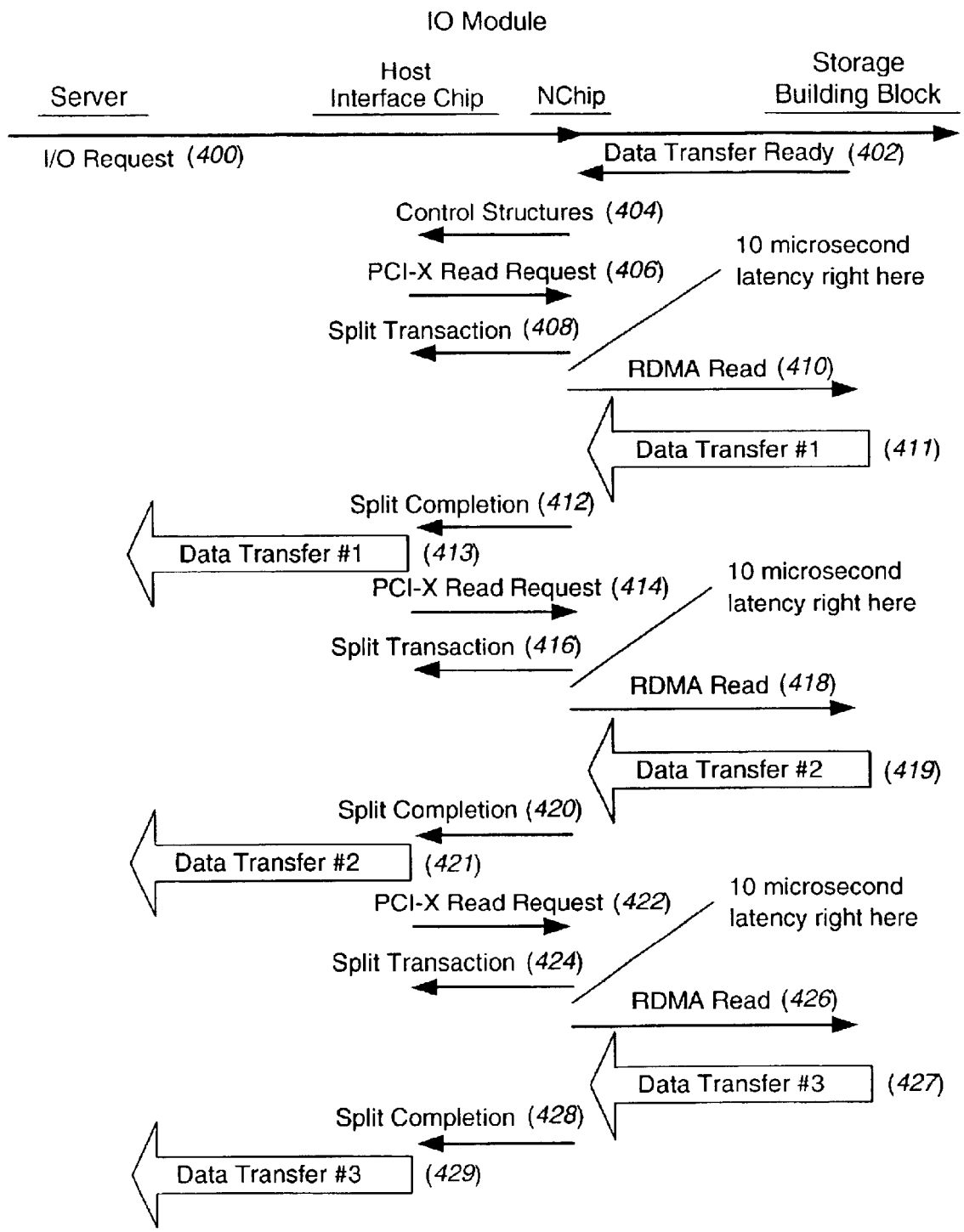
FIG._4

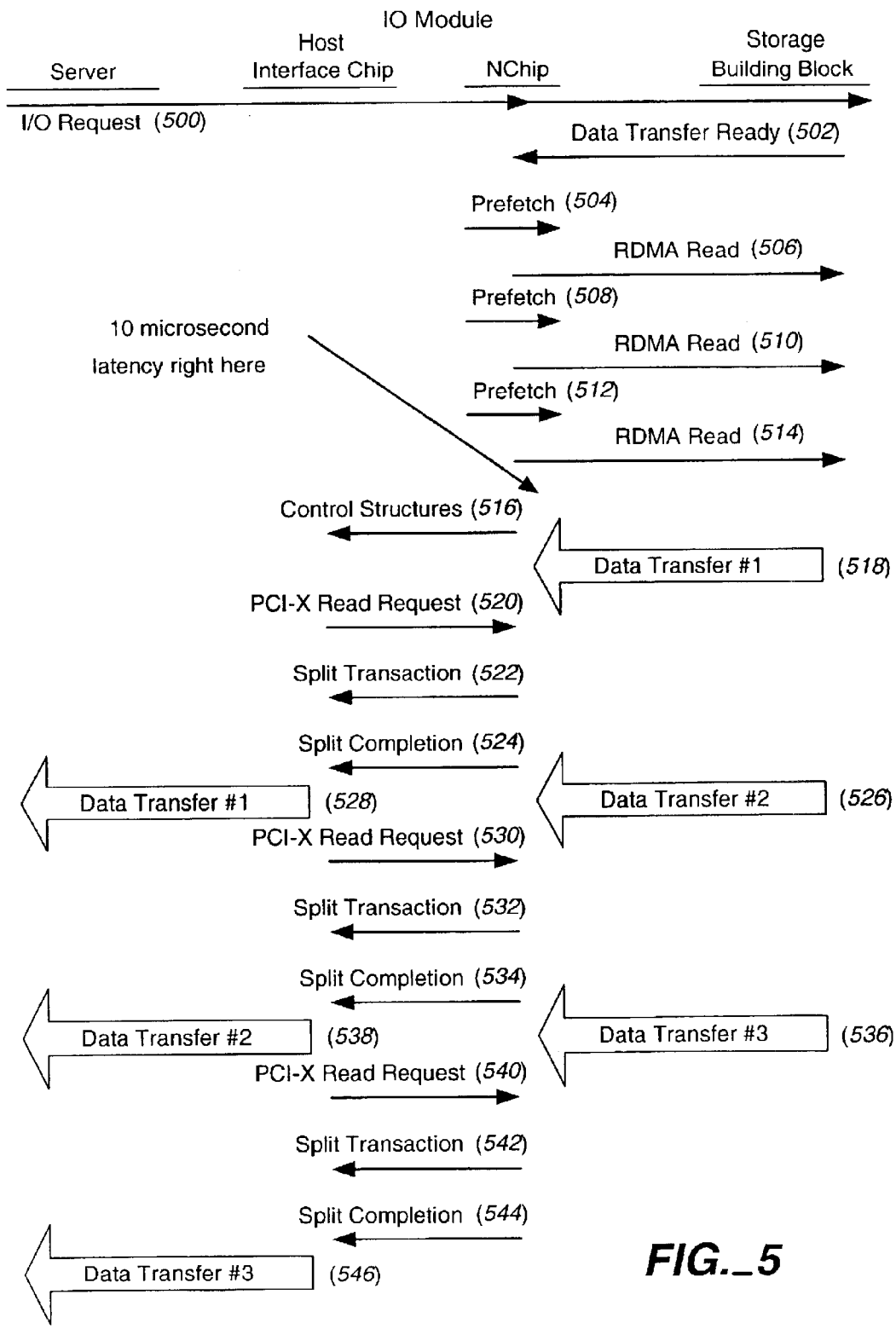
FIG._5

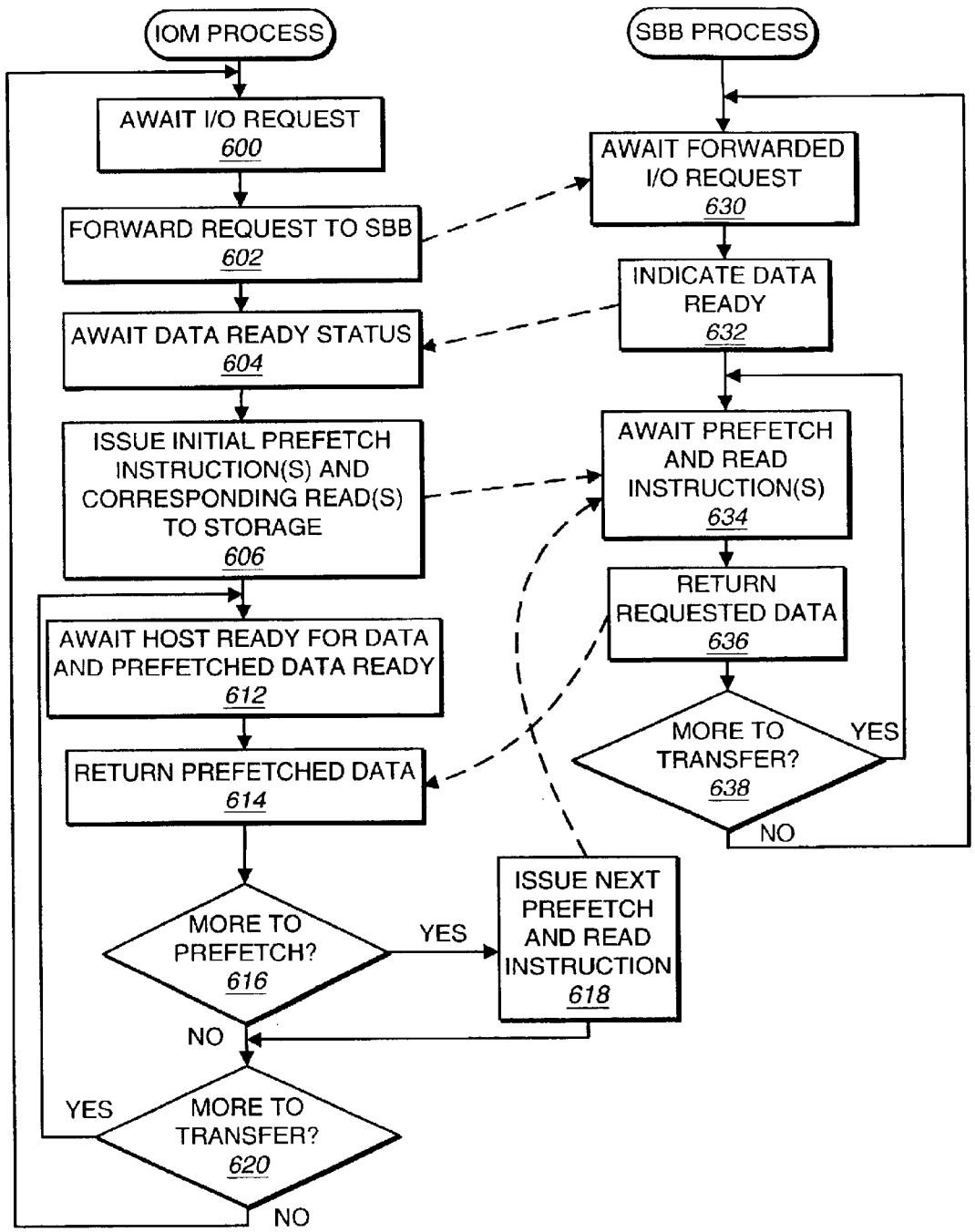
FIG._6

METHOD AND STRUCTURE FOR READ PREFETCH IN A STORAGE COMPLEX ARCHITECTURE

BACKGROUND OF THE INVENTION

1. Field of the Invention

The invention relates to storage subsystems and in particular to improved performance in a storage subsystem that includes networked hierarchical components within the storage subsystem where transactions within the system may incur latencies.

2. Related Patents

This patent application is related to co-pending, commonly owned U.S. patent application Ser. No. 02-5574, entitled METHOD AND APPARATUS FOR HANDLING STORAGE REQUESTS, filed the same day which is hereby incorporated by reference and is referred to herein as the "related patent."

3. Discussion of Related Art

Computing systems and applications use persistent storage devices and subsystems to store and retrieve information. Storage subsystem requirements for capacity, performance and reliability continue to grow as corresponding needs grow in such storage subsystem applications.

It is generally known in the art to use redundant arrays of independent/inexpensive disks (typically referred to by the acronym RAID) to improve both performance and reliability of storage subsystems. RAID storage management techniques, in general, distribute stored information over a plurality of disk drives. Such distribution of stored information over a plurality of disk drives improves performance by distributing associated seek and rotational latencies over multiple disk drives operating in parallel. In general, additional disk drives degrade overall subsystem reliability by increasing the number of potentially failing components and hence reducing mean time between failure of the associated system. RAID techniques enhance reliability by generating redundancy information associated with all stored information and storing such redundancy information along with host supplied data. The redundancy information, in general, allows a RAID storage subsystem to survive failure of a single disk drive in the array and permits continued operation though potentially in a degraded mode.

In some storage system architectures, it is known to utilize an I/O module ("IOM") associated with the storage system to serve as an interface between attached host systems and lower-level storage elements sometimes referred to as storage building blocks ("SBB"). Examples of such system architectures are described in the related patent.

In such an architecture it is common that the I/O module and storage building blocks are interconnected through one or more communication structures including, for example, a PCI bus (in particular, a PCI-X bus is a common architecture often utilized in such embedded applications). Regardless of the particular communication medium used to interconnect the I/O module and storage building block, it is common in that some latency will be imposed between the read request (directed from the I/O module to the associated storage building block) and the corresponding return of requested data from the storage building block to the I/O module (for ultimate return to the requesting host system).

In such an architecture it is common that the I/O module and storage building blocks are interconnected through one or more communication structures including, for example, a PCI bus (in particular, a PCI-X bus is a common architecture often utilized in such embedded applications). Regardless of the particular communication medium used to interconnect the I/O module and storage building block, it is common in that some latency will be imposed between the read request (directed from the I/O module to the associated storage building block) and the corresponding return of requested data from the storage building block to the I/O module (for ultimate returned to the requesting host system).

More specifically in one exemplary embodiment described in the above referenced co-pending patent applications, a PCI-X bus is utilized in a portion of the path communicating between an I/O module and the storage building block. More specifically, a PCI-X bus is used within the IOM to couple a front-end host communication channel interface (such as Fibre Channel) to a back-end SBB interface (such as a custom ASIC for switched fabric communication). In such an exemplary embodiment, the I/O module front-end issues a PCI-X read request directed toward the IOM back-end interface to the appropriate storage building block. The IOM front-end receives a split transaction from the storage building block indicating that a delay may be incurred as the storage building block retrieves and/or otherwise prepares the requested data. Eventually, the storage building block returns the requested data and completes the entire transaction with a split transaction completion indication on the PCI-X bus.

Such a transaction will incur a latency as the storage building block performs overhead processing associated with identifying and retrieving the requested block of information (even when the requested block already resides in higher speed cache memory within the storage building block).

In high-performance storage applications, such latency delays impose undesirable limitations on storage subsystem bandwidth especially for high-performance read requirements in storage subsystem applications. It is evident from the above discussion that an ongoing problem exists to improve available bandwidth utilization in storage subsystems utilizing internal bus structures for communication between I/O control elements and storage elements and to thereby improve overall storage subsystem performance.

SUMMARY OF THE INVENTION

The present invention solves the above and other problems, thereby advancing the state of the useful arts, by providing methods and associated structure for enabling prefetch operations in a storage system so as to reduce or eliminate latency associated with delays imposed by storage elements in the storage system retrieving requested data. More specifically, the present invention provides for methods and associated structure to prefetch data associated with a host system read request in advance of the return of such data to the requesting host system. These methods and associated structure reduce or eliminate the latency inherent in such I/O system architectures where a communication medium used between an I/O control element of a storage system and associated storage building block elements imposes latency in bus transactions where a storage building block is not yet ready to return requested data. In particular, the methods and associated structure of the present invention eliminate latency associated with PCI-X bus split transaction processing where a storage building block coupled to an I/O module through a PCI-X bus would normally impose a delay before returning requested data. By contrast, the methods and associated structures of the present invention prefetch data in advance of returning the data to the requesting host to thereby eliminate all but the first such latency in a sequence of block transfers corresponding to a host system request.

A first feature of the invention therefore provides a method operable in an I/O element adapted to exchange information with a host system and coupled to a storage element via a communication medium, the method comprising the steps of: receiving a request from an attached host system such that the request identifies a plurality of data blocks to be returned from the storage element to the host system; and transmitting a plurality of prefetch reads to the storage element via the communication medium in advance of returning any of the plurality of data blocks to the attached host system.

Another aspect of the invention further provides for the steps of: receiving data from the storage element in response to the plurality of prefetch reads; and returning the data to the host system.

Another aspect of the invention further provides for the step of: repeating the steps of receiving data and returning the data until all of the plurality of data blocks are returned to the host system.

Another aspect of the invention further provides for the steps of: determining whether prefetch reads have been transmitted for all data identified in the request; and transmitting an additional prefetch read to the storage element via the communication medium in response to a determination that prefetch reads have not been transmitted for all data identified in the request.

Another aspect of the invention further provides for the step of: repeating the steps of receiving data, returning the data, determining and transmitting the additional prefetch read, until all of the plurality of data blocks are returned to the host system.

Another aspect of the invention further provides that the number of the plurality of prefetch reads is at least 4.

A second feature of the invention provides a method operable in a storage subsystem I/O element adapted to exchange information with a host system and coupled to a storage element via a bus structure that incurs a latency in each bus transaction, the method comprising the steps of: receiving a request from an attached host system such that the request identifies a plurality of data blocks to be returned from the storage element to the host system; and incurring the bus transaction latency only during an initial bus transaction issued to retrieve data from the storage element in response to receipt of the request.

Another aspect of the invention further provides that the step of incurring comprises the step of: prefetching an initial portion of the plurality of data blocks in advance of returning any of the plurality of data blocks to the attached host system.

Another aspect of the invention further provides that the step of prefetching comprises the step of: transmitting a plurality of prefetch reads to the storage element via the bus structure.

Another aspect of the invention further provides for the step of: overlapping subsequent bus transaction latency with return of requested data blocks to the host system.

Another feature of the invention provides for a storage system comprising: an I/O element adapted to couple the storage system to a host system and adapted to process requests from the host system to retrieve data; a plurality of storage elements for storage of data provided by the host system and for retrieval of the data by the host system; and a communication medium coupled to the I/O element and coupled to the plurality of storage elements for exchange of information there between where the communication medium incurs latency overhead associated with each transaction thereon for exchange of information, such that the I/O element is further adapted to incur the latency overhead in an initial transaction on the communication medium in response to receipt of a request from the host system, and such that the I/O element is further adapted to overlap return of latency overhead associated with subsequent transactions on the communication medium in response to the request.

Another aspect of the invention provides that the communication medium is a PCI-X compliant bus structure.

BRIEF DESCRIPTION OF THE DRAWINGS

FIG. 1 is a diagram of an exemplary system in which the prefetch features of the present are advantageously applied.

FIG. 2 is a diagram providing additional details of an exemplary embodiment of a storage system in which features of the present invention are advantageously applied.

FIG. 3 is a diagram providing additional details of an exemplary I/O module as shown in FIG. 2.

FIG. 4 is a data flow diagram describing the flow of information between elements of a system as practiced in the related patent.

FIG. 5 is a data flow diagram describing the flow of information between elements of a system enhanced with features of the present invention.

FIG. 6 is flowcharts describing methods of the present invention for improving performance in a storage system.

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference to FIG. 1, an exemplary preferred embodiment of the invention is shown in system 100. System 100 is configured for handling I/O requests from host systems, such as host systems 110 and 112, to storage system 101. Examples of the host systems include computing environments ranging from individual personal computers and workstations to large networked enterprises encompassing numerous, heterogeneous types of computing systems. The host systems may be communicatively connected to I/O modules, such as I/O modules 106 and 108, for processing the requests through a variety of connections. Examples of such connections include Fibre Channel (FC), Small Computer System Interface (SCSI), Internet SCSI (ISCSI), Ethernet, Infiniband, SCSI over Infiniband (e.g., SCSI Remote Direct Memory Access Protocol, or SRP), piping, and/or various physical connections. Infiniband is an architecture and specification for data flow between processors and I/O devices. Those skilled in the art understand Infiniband and can retrieve information about Infiniband from: http://www.infinibandta.org/home. A variety of well-known operating systems may be employed in such computing environments depending upon the needs of particular users and enterprises.

Within storage system 101, I/O modules 106 and 108 process the I/O requests from the host systems to access physical storage space within storage elements 102 and 104. The requests are transferred from the I/O modules to the storage elements through a communication medium, such as switching fabric 114. Each of the storage elements may include one or more storage volumes such as standard hard disk drives (e.g., those often found in personal computers), and other types of storage devices (e.g., optical storage, tape storage, semiconductor storage). Each of storage elements 102 and 104 may include a storage controller, discussed in FIG. 2, for processing requests, such as read and write requests from host systems directed to the storage elements by I/O modules 106 and 108. The number of host systems, storage elements, and I/O modules is not intended to be limited to the number of host systems, storage elements, and I/O modules in the embodiment. Additionally, in some embodiments, the I/O modules are housed within the host systems.

FIG. 2 illustrates additional detail of an exemplary preferred embodiment of a storage system 200. Storage system 200 includes a plurality of I/O modules 202, communication switches 206, and virtualized storage elements 208, 209 and 210. Each of the storage elements 208, 209 and 210 includes storage controllers, such as storage controllers 208A. 208N of virtualized storage element 208, storage controllers 209A . . . 209N of virtualized storage element 209, and storage controllers 210A . . . 210N of virtualized storage element 210. These storage elements and storage controllers can be configured to employ a storage management scheme such as that of a RAID storage management system. As such, the storage controllers may include RAID storage controllers for processing the requests of host systems, such as host systems 110 and 112 of FIG. 1 forwarded through I/O modules 202 and communication switches 206.

The I/O modules 202, discussed in greater detail below with reference to FIG. 3, have host connect interfaces for receiving I/O requests from the host systems and transferring data between the host systems and the virtualized storage elements. The I/O modules 202 can connect to the host systems through a variety of means, such as those described in FIG. 1. Each I/O module is communicatively connected to a switching fabric comprising communications switches 206 through an "N-chip" $202_{N\text{-}chip}$. The N-chips $202_{N\text{-}chip}$ are devices, such as Application Specific Integrated Circuits (ASIC), configured to route data from a host system through the switching fabric and to a virtualized storage element according to the specific virtual address. Those skilled in the art are familiar with communications switches and will readily recognize the design of such a custom ASIC for purposes of transferring messages through such a switched fabric or other communication medium.

The communications switches are communicatively connected to the virtualized storage elements 208, 209 and 210 through their associated storage controllers, 208A . . . 208N, 209A . . . 209N, and 210A . . . 210N, respectively. The storage controllers, like I/O modules 202, include storage controller N-chips 212, such as N-chip $212_{208A}$ of storage controller 208A. These storage controller N-chips are devices, such as ASICs, configured to retrieve and store data of the virtualized storage elements according to the specific virtual address from I/O modules 202. The storage controller N-chips 212 receive the specific virtual addresses from I/O modules 202 and extract, inter alia, addressing information to locate data on physical storage volumes within a virtualized storage element. Once a physical location of the data of the storage element is determined, the storage controller can retrieve the data from the storage element to the host system or store data from the host system at the physical location of the storage element.

FIG. 3 illustrates an exemplary preferred embodiment of I/O module 202, such as that illustrated in FIG. 2. I/O module 202 includes host interface 302, bus 304, N-chip $202_{N\text{-}chip}$, processor 308, and memory 306. Host interface 302 is an interface capable of communicating to a host system, such as host system 110 of FIG. 1, through a variety of means, such as FC, SCSI, ISCSI, Ethernet, Infiniband, SCSI over Infiniband, piping, and/or various physical connections. Host interface 302 receives an I/O request from the host system to access a block of storage space within a storage element, such as virtualized storage element 208 of FIG. 2. Host interface 302 transfers that I/O request to N-chip $202_{N\text{-}chip}$ through bus 304. N-chip $202_{N\text{-}chip}$ then maintains information about the I/O request and transfers the request to the appropriate virtualized storage element.

In exchanging information and commands between I/O modules 202 and attached storage elements, information must pass over bus 304 as well as switched fabric 206 of FIG. 2. In combination or individually, all such communication paths are exemplary of communication media in which latencies may be imposed in transactions to exchange data and control messages. As noted above, methods of the present invention are operable in the structure depicted, for example, in FIGS. 1–3 to reduce or eliminate the latency associated with such transfers. This reduction of latencies improves overall subsystem performance by better utilizing available bandwidth for transfers within the storage subsystem.

FIG. 4 is a data flow diagram describing a sequence of information exchange between a host system, an I/O module, and a storage building block (e.g., storage element) as practiced without the benefit of the present invention. The depicted data flow incurs latency delays at each read transaction over the PCI-X bus within the I/O module as exemplified in FIGS. 1–3 discussed above. In general. FIG. 4 shows data transfers between the various elements as time progresses downward in the figure. In general, data is transferred from the storage building block to the I/O module via a communication medium. The communication medium may include, for example, a switched fabric communication medium as well as internal bus structures within the I/O module such as a PCI-X bus. Such communication media and in particular a PCI bus may impose certain latencies associated with various bus transactions thereon.

More specifically, in one exemplary sequence of exchanges as presently known in the art, an I/O request is generated by a host system and transferred to the I/O module as shown by I/O request 400. Such a request is partially processed at the I/O module and partially within the storage elements coupled thereto. Relevant information in the I/O request is forwarded through the I/O module to the storage building block. In response to receipt of the forwarded request, the storage building block retrieves the requested blocks of data. Following retrieval of the requested blocks of data from the persistent storage devices (e.g., disk drives or other nonvolatile storage media), a data transfer ready message 402 is returned from the storage building block to the I/O module indicating readiness of the requested data. An appropriate control structure message 404 may be generated by the I/O module and exchanged between the back-end elements thereof (i.e., the N-chip) and the front-end elements thereof (e.g., the host interface chip). Such control messages may indicate, for example, location information of the requested data now retrieved by the storage building block and staged within its cache memories. Such location information may be expressed as, for example, virtual addresses or other location indicia. Based on these control structures, the front-end elements of the I/O module may issue an appropriate read request 406 and forward such a read request to the back-end element of the I/O module. The back-end elements of the I/O module may then determine that the first portion (i.e., first block) of the requested data will eventually be retrieved from the storage building block and returns a split transaction message to the front-end element of the I/O module indicating that a delay may be incurred before requested data is returned. The back-end elements of the I/O module then issues an appropriate RDMA or other read request 410 to the storage building block to retrieve specific requested data blocks.

As noted elsewhere herein, one specific exemplary embodiment uses a PCI-X bus to couple the I/O module front-end elements to the I/O module back-end elements. In such a bus structure use of split transaction protocols may incur a latency of approximately 10 microseconds before a next bus transaction may be processed. As noted above, such a latency may impact overall storage subsystem performance by underutilizing available bandwidth of the PCI-X bus in moving data through the I/O module.

Eventually, the DMA or other read request 410 completes the requested data transfer 411 and thereby permits the I/O module back-end to signify completion of the split transaction 412 as a message directed to the front-end elements of the I/O module over the intermediate PCI-X bus. The front-end elements of the I/O module then transfer data 413 back to the requesting host system. This process continues iteratively as indicated by data flow references 414 through 421 and 422 through 429 etc. until all requested data has been returned to the host system. As can be seen from FIG. 4, a latency delay is incurred with each transfer of data from the storage building block back through the I/O module to the host system. The cumulative effect of such delays in processing an entire I/O request can significantly impact overall performance of the storage subsystem by underutilizing the available bandwidth of the various communication media involved in the data transfer paths.

Those of ordinary skill in the art will readily recognize that the processing depicted by the flow charts of FIG. 6 may be performed by numerous equivalent methods involving the exchange of similar messages and signals to coordinate processing between the two elements. An aspect of the present invention lies in the prefetching of requested data in advance of actual return of requested data to the requesting host system. Numerous equivalent methods and communication messages and signals will be readily apparent to those of ordinary skill in the art as matters of well-known design choice. Still further, those of ordinary skill in the art will recognize that the flow charts of FIG. 6 as generally described herein address exclusively read operations requested by an attached host system. Other types of requests may be generated by an attached host system and appropriate processing performed within I/O modules and storage elements. Such additional operations are generally outside the scope of the present invention and need not be discussed further herein. In addition, those of ordinary skill in the art will recognize a variety of errors that may be encountered and appropriate error processing and recovery associated with such errors. The methods described above with respect to FIG. 6 do not address such error detection and recovery processing. Rather, such error detection and correction processing techniques are well-known to those of ordinary skill the art as matters of design choice.

FIG. 5 is a data flow diagram describing improvements achieved in one exemplary embodiment of the present invention. As discussed further herein below, methods of the present invention operable within architectures such as described in FIGS. 1 through 3 may reduce or eliminate latency delays associated with transfers from storage elements to a requesting host system. As above, such a request is initiated from a host system as I/O request 500 forwarded through the front-end and back-end elements of an I/O module to an associated storage element (storage building block). The storage element, as above, returns a data ready message 502 indicating to the back-end elements of the I/O module that the requested data is ready for transfer.

Unlike present techniques described above with respect to FIG. 4, methods and associated systems of the present invention issue one or more prefetch read instructions 504, 508 and 512 and associated read requests 506, 510 and 514 prior to any bus transactions within the I/O module that may incur a bus transaction latency. Following transmission of one or more such prefetch and read instructions from the I/O module back-end to the storage element, a single bus latency period may be incurred. At this point, back-end elements of the I/O module communicate control structure messages 516 to the front-end processing elements signifying to the front-end elements that requested data may be read from the storage building block through the back-end element.

A data transfer 518 corresponding to a first of the prefetch and read instructions (i.e., 504 and 506) then moves data from the storage element to the back-end elements of the I/O module. The front-end elements of the I/O module then issue appropriate read operations 520 over the PCI-X bus to retrieve the prefetched data. Appropriate communication transactions indicating split transaction 532 and an associated split completion 524 along with a transfer of the data 528 from the I/O module front-end back to the requesting host system may overlap receipt of the additional prefetched data 526 transfer from the storage building block to the back-end elements of the I/O module. Such transfer sequences may then repeat iteratively (i.e., 530, 532, 534 and 538 as well as a 540 . . . 546) so as to overlap with receipt of additional prefetched data 536. The depicted sequence of data transfers reduces the negative impact of subsequent latency delays that may reduce utilization of available bandwidth in the communication media between the storage elements and the requesting host systems. Rather, the prefetch and read operations (504 through 514) cause data transfers from the storage building block to the back-end of the I/O module (518, 526 and 536) to overlap with other transactions on the communication medium within the I/O module (i.e., the PCI-X bus or other similar communication media).

Those of ordinary skill in the art will readily recognize that any number of initial prefetch and associated read operations (504 through 514) may be performed as dictated by the needs of a particular application. The timing and protocols associated with the selected communication medium that may impose such latency delays and the bandwidth capability of various communication channels used within the storage system as well as those between the storage system and the host system will be factors in determining the desired number of prefetch read instructions to be initially generated. Further, those of ordinary skill in the art will readily recognize that additional prefetch and corresponding read operations may be added to the sequence as appropriate to continue the desired overlap of transfer between the storage building block and the back-end of the I/O module with transfers between the front-end to the I/O module and the requesting host system. Still further, those of ordinary skill in the art will readily recognize particular bus architectures and protocols associated therewith that may dictate other sequences of bus transactions or communication medium transactions associated with such transfers and corresponding latency delays. The data flow depicted in FIG. 5 is therefore intended merely as exemplary of one possible exemplary data flow associated with methods and structures of the present invention to reduce overall latency delays and thereby improve overall efficiency of the corresponding storage subsystem.

FIG. 6 provides flowcharts describing the cooperative processing of methods operable within the storage system benefiting from methods and structures of the present invention. In particular, the flowchart on the left side of the figure describes methods operable within the I/O module of such a system while the flow chart on the right depicts cooperative methods operable within the storage building block (storage element) of such a storage system. Dashed lines interconnecting various processing elements in each of the two flow charts indicate data flow or messages associated with the cooperation between the two processes.

Element 600 is first operable within the I/O module to await receipt of an I/O request from an associated host system. As generally described above, a host system initiates the data transfer process by requesting the return of particular identified blocks or portions of data previously stored in the storage subsystem. Such a request is initially received by the I/O module through its host interface chip as discussed above. Those of ordinary skill in the art will readily recognize that a variety of communication media and associated protocols may be involved with such a transfer of a host request to the I/O module of the storage subsystem. Element 602 is next operable to forward information regarding such a received I/O request to the appropriate storage building block (storage element). As generally described above, forwarding of such information involves use of a variety of communication media within the storage subsystem including, for example, internal bus structures and/or switched fabric communication elements interconnecting the various control and storage elements of the storage subsystem. More generally, all such communication paths may be referred to herein as communication media. The dashed line out of element 602 indicates data flow transferring such an I/O request to the storage building block for appropriate processing therein. Element 604 is operable to await receipt from the storage element of a data ready message indicator. Receipt of such a message is indicated by a dashed line inbound to element 604 from methods associated with the storage building block.

Upon indication of a data ready status, element 606 is operable to issue one or more initial prefetch instructions and corresponding DMA read operations to the storage element of the storage subsystem. Such prefetch and read operations are forwarded to the storage elements to invoke further processing within the storage elements associated with retrieval of the requested data. As noted above, any number of initial prefetch and read operations may be issued by the methods and structures associated with the I/O module as required for particular application. Factors involved in determining the appropriate number of such prefetch operations include, for example, bandwidth of the various communication paths (communication media) between the I/O module and storage building block, bandwidth and associated latencies of communication paths within the I/O module and bandwidth and latency measures associated with communication between the I/O module and host systems. Preferably, a sufficient number of prefetch and read operations are directed to the storage building block to permit ongoing data transfer operations to overlap with any possible latency delays associated with communication paths such that the available bandwidth between the storage building block and the associated host system may be fully utilized.

Following issuance of one or more initial prefetch and read operations, element 612 is next operable to await indication from the requesting host system that it is ready to receive requested data. Upon such an indication of readiness from the requesting host system, element 614 is next operable to return a first portion of the prefetched, requested data to the requesting host system. The data to be returned is received from the storage building block (storage element) processing as indicated by the dashed line entering element 614. Element 616 is next operable within the I/O module processing to determine if more requested data remains to be prefetched from the storage building block. As noted above, a continuing sequence of prefetched data may be retrieved from the storage building block in such a manner as to overlap with transfers of data from the I/O module to a requesting host system. Such an overlap of processing eliminates the effect of any subsequent latency delays associated with communication media within the storage subsystem or between storage subsystem and the requesting host system. Eliminating the observable effect of such latency delays in effect maximizes the throughput of the storage subsystem as regards the return of data to the requesting host system. Only the latency delays associated with the issuance of the initial prefetched instructions described above with respect to element 606 remains an issue potentially impacting overall system performance. However, such a single incident of latency delay represents a relatively minimal impact on overall subsystem performance as compared to the cumulative effect of potentially several latency delays as discussed above and as presently practiced in the art. If element 616 determines that more requested data remains to be prefetched, element 618 issues a next prefetch and read operation to the storage building block to continue the sequence of prefetching requested data in advance of returning the data to the requesting host system and overlapping other data transfers associated with the I/O module.

Lastly, element 620 determines if more data, already prefetched from the storage building block, remains to be transferred to the requesting host system. If so, processing continues by looping back to element 612 to continue transferring data to the requesting host system and to continue prefetching additional data expected to be transferred to the requesting system.

The flow chart on the right side of FIG. 6 describes a method of the present invention operable within the storage element in conjunction with and in cooperation with the process described above generally operable within the I/O module of the storage subsystem. As above, dashed lines in and out of elements of the flow chart indicate associated data flow between corresponding elements in the cooperative processing performed on the I/O module and the storage building block. Element 630 is first operable to await receipt of an I/O request from a requesting host computer and forwarded through the I/O module. Upon receipt of such an I/O request signified by the dashed line entering element 630, the storage building block prepares to transfer the requested data to the requesting host system through the I/O module. Such preparations may include, for example, physical retrieval of the appropriate blocks of data from the storage elements for temporary storage in cache memory within the storage building block (storage element). Details of the precise preparations appropriate to any particular system are well-known matters of design choice for those of ordinary skill in the art.

Upon receipt of such a request and appropriate preparation of data, element 632 is operable to indicate readiness of the requested data. Such a data ready message or signal is transmitted to the cooperative process within the I/O module as signified by the dashed line exiting element 632. Having so signified readiness of the requested data, element 634 represents processing to await receipt of a prefetch and read operation provided by cooperative processing within the I/O module as signified by either of the two dashed lines entering element 634. Upon receipt of such a prefetch and read operation, element 636 is next operable to return the requested data previously prepared by the storage element by operation of element 630 as discussed above. The prefetch and read operation is typically implemented in the form of a DMA request directed through the switched fabric communication medium as discussed herein. Those of ordinary skill in the art will recognize that the specific form of such a read request and the resultant return of requested data may be implemented by any of several equivalent techniques associated with an appropriate communication medium coupling the I/O module and the storage element. Return of the requested data by processing of element 636 is signified by the dashed line exiting the element to provide data to the corresponding, cooperative processing element within the I/O module. Element 638 is next operable to determine if additional data remains to be transferred corresponding to the forwarded I/O request and previously prepared by operation of element 630. If so, processing continues by looping back to element 634 to await a next prefetch and read operation received from cooperative processing within the I/O module. If no further data remains to be transferred for this particular I/O request, processing continues by looping back to element 630 to await receipt of a next forwarded I/O request.

Those of ordinary skill in the art will readily recognize that the processing depicted by the flow charts of FIG. 6 may be performed by numerous equivalent methods involving the exchange of similar messages and signals to coordinate processing between the two elements. An aspect of the present invention lies in the prefetching of requested data in advance of actual return of requested data to the requesting host system. Numerous equivalent methods and communication messages and signals will be readily apparent to those of ordinary skill in the art as matters of well-known design choice. Still further, those ordinary skill in the art will recognize that the flow charts of FIG. 6 as generally described herein address exclusively read operations requested by an attached host system. Other types of requests may be generated by an attached host system and appropriate processing performed within I/O modules and storage elements. Such additional operations are generally outside the scope of the present invention and need not be discussed further herein. In addition, those of ordinary skill in the art will recognize a variety of errors that may be encountered and appropriate error processing and recovery associated with such errors. The methods described above with respect to FIG. 6 do not address such error detection and recovery processing. Rather, such error detection and correction processing techniques are well-known to those ordinary skill the art as matters of design choice.

While the invention has been illustrated and described in the drawings and foregoing description, such illustration and description is to be considered as exemplary and not restrictive in character. One or more exemplary embodiments of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. In an I/O element adapted to exchange information with a host system and coupled to a storage element via a communication medium that imposes transaction overhead, a method comprising the steps of:

receiving a request from an attached host system wherein said request identifies a plurality of data blocks to be returned from said storage element to said host system;

transmitting a plurality of prefetch reads to the storage element via said communication medium in advance of returning any of said plurality of data blocks to said attached host system; and overlapping the transaction overhead associated with all but an initial transaction for transmitting said plurality of prefetch reads with return of requested data blocks to said host system.

2. The method of claim 1 further comprising the steps of:

receiving data from said storage element in response to said plurality of prefetch reads; and returning said data to said host system.

3. The method of claim 2 further comprising the step of:

repeating the steps of receiving data and returning said data until all of said plurality of data blocks are returned to said host system.

4. The method of claim 2 further comprising the steps of:

determining whether prefetch reads have been transmitted for all data identified in said request; and transmitting an additional prefetch read to the storage element via said communication medium in response to a determination that prefetch reads have not been transmitted for all data identified in said request.

5. The method of claim 4 further comprising the step of:

repeating the steps of receiving data, returning said data, determining and transmitting said additional prefetch read, until all of said plurality of data blocks are returned to said host system.

6. The method of claim 1 wherein the number of said plurality of prefetch reads is at least 4.

7. In a storage subsystem I/O element adapted to exchange information with a host system and coupled to a storage element via a bus structure that incurs a latency in each bus transaction, a method comprising the steps of:

receiving a request from an attached host system wherein said request identifies a plurality of data blocks to be returned from maid storage element to said host system;

incurring said bus transaction latency associated with maid request only during an initial bus transaction issued to retrieve data from said storage element in response to receipt of said request; and overlapping subsequent bus transaction latency, associated with said request, with return of requested data blocks to said host system.

8. The method of claim 7 wherein the step of incurring comprises the step of:

prefetching an initial portion of said plurality of data blocks in advance of returning any of said plurality of data blocks to said attached host system.

9. The method of claim 8 wherein the step of prefetching comprises the step of:

transmitting a plurality of prefetch reads to the storage element via said bus structure.

10. A storage system comprising:

an I/O element adapted to couple said storage system to a host system and adapted to process requests from said host system to retrieve data;

a plurality of storage elements for storage of data provided by said host system and for retrieval of said data by said host system; and a communication medium coupled to said I/O element and coupled to said plurality of storage elements for exchange of information there between where said communication medium incurs latency overhead associated with each transaction thereon for exchange of information, wherein said I/O element is further adapted to incur said latency overhead in an initial transaction on said communication medium in response to receipt of a request from said host system, and wherein said I/O element is further adapted to overlap return of latency overhead associated with subsequent transactions on said communication medium in response to said request.

11. The system of claim 10 wherein said communication medium is a PCI-X compliant bus structure.

12. A system comprising:

a storage element for storage of information;

an I/O element adapted to exchange information with a host system; and a communication medium that imposes transaction overhead coupling said I/O element to maid storage element, wherein said I/O element includes:

means for receiving a request from an attached host system wherein said request identifies a plurality of data blocks to be returned from said storage element to said host system; and means for transmitting a plurality of prefetch reads to the storage element via said communication medium in advance of renaming any of said plurality of data blocks to said attached host system, wherein the transaction overhead associated with said plurality of prefetch reads is overlapped with return of requested data blocks to said host system for all transactions other than an initial transaction associated with transmitting the plurality of prefetch reads.

13. The system of claim 12 wherein said I/O element further comprises:

means for receiving data from said storage element in response to said plurality of prefetch reads; and means for returning said data to said host system.

14. The system of claim 13 wherein said I/O element further comprises:

means for iteratively invoking the means for receiving said data and the means for returning said data until all of said plurality of data blocks are returned to said host system.

15. The system of claim 13 wherein said I/O element further comprise:

means for determining whether prefetch reads have been transmitted for all data identified in said request; and means for transmitting an additional prefetch read to the storage element via said communication medium in response to a determination that prefetch reads have not been transmitted for all data identified in said request.

16. The system of claim 15 said I/O element further comprises:

means for iteratively invoking the means for receiving said data, the means for returning said data, the means for determining and the means for transmitting said additional prefetch read, until all of said plurality of data blocks are returned to said host system.

17. The system of claim 12 wherein the number of said plurality of prefetch reads is at least 4.

* * * * *